UNITED STATES PATENT OFFICE.

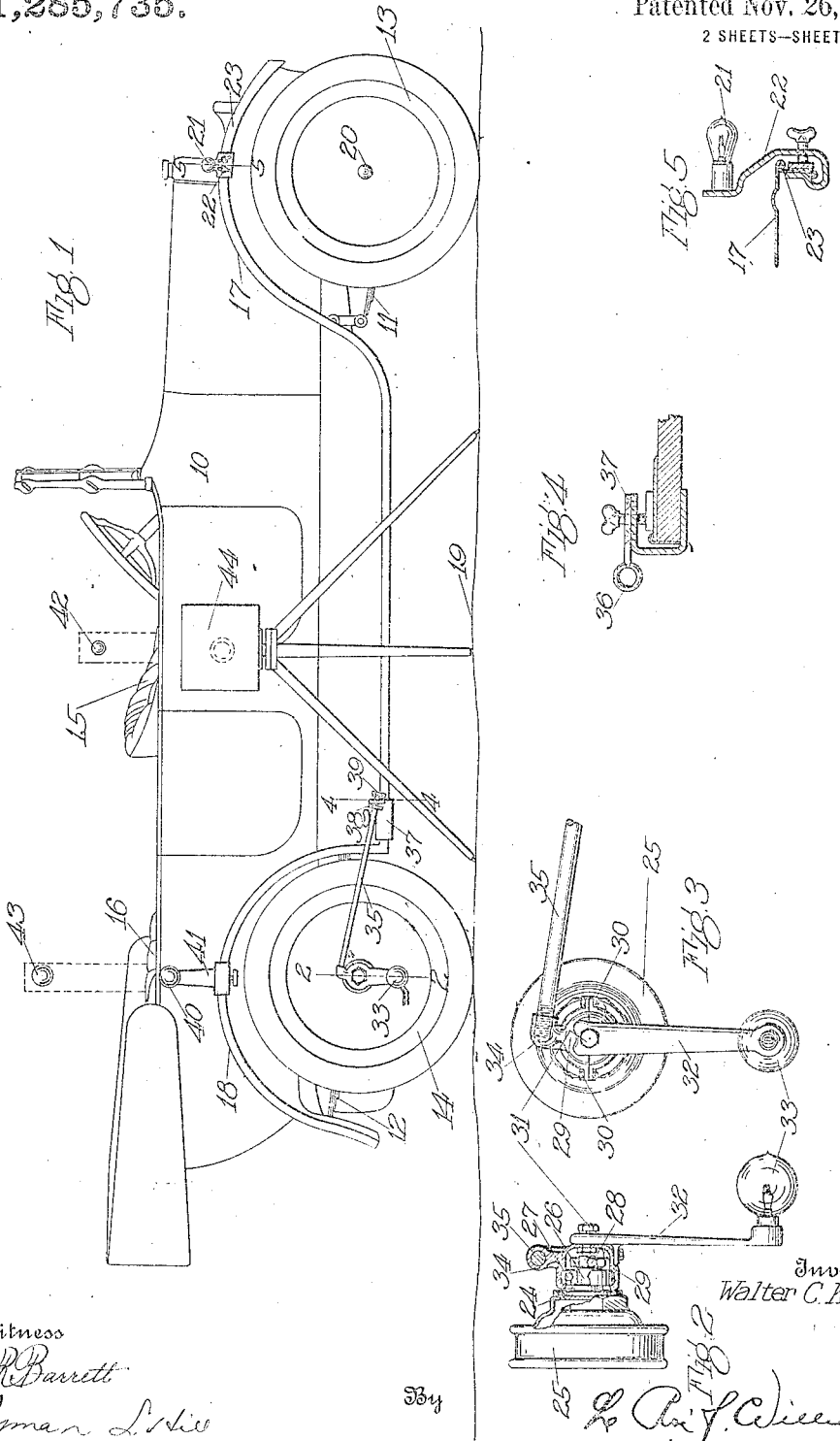

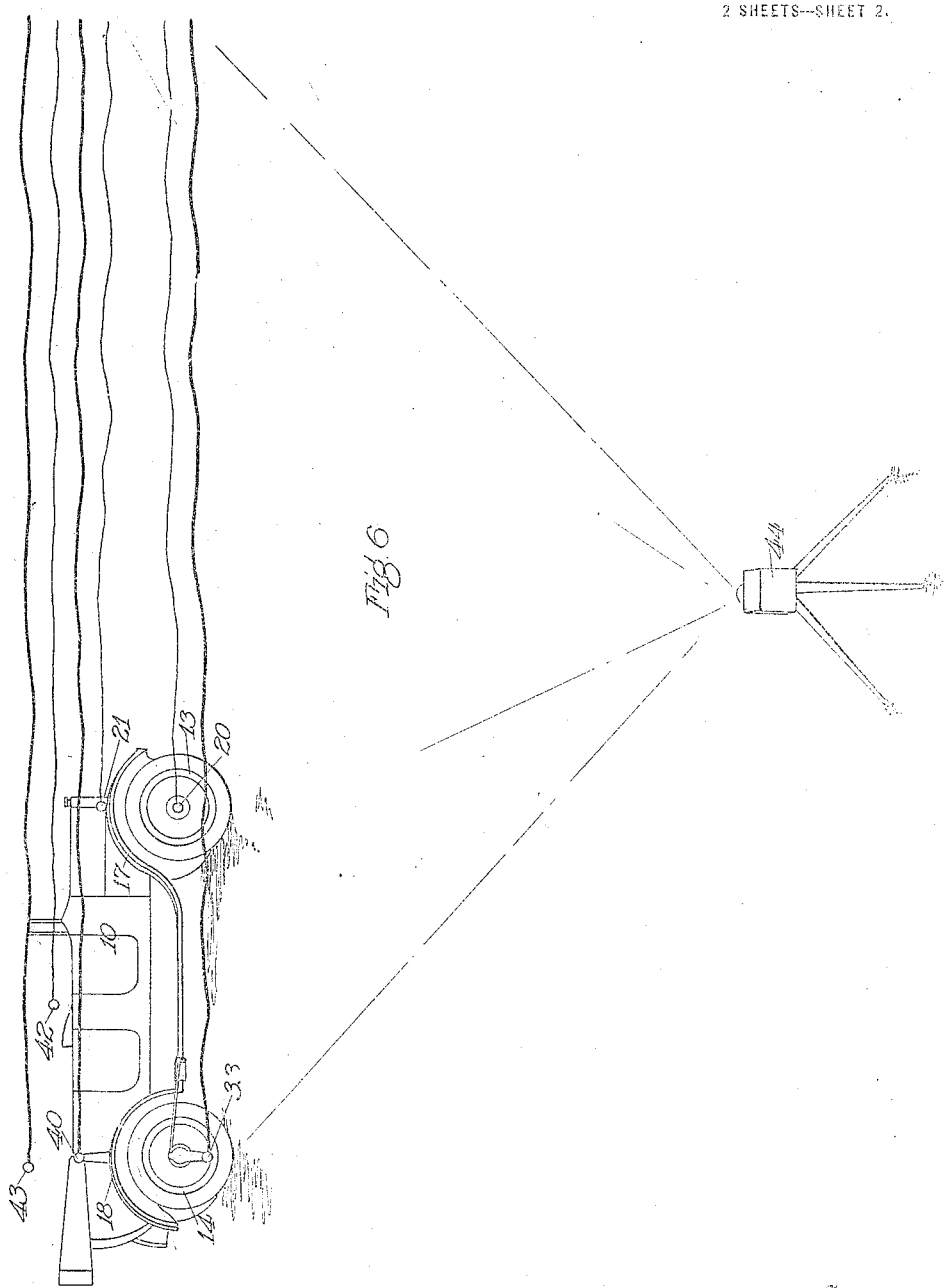

WALTER C. KEYS, OF DETROIT, MICHIGAN, ASSIGNOR TO CADILLAC MOTOR CAR COMPANY, OF DETROIT, MICHIGAN, A CORPORATION OF MICHIGAN.

METHOD OF DETERMINING MOVEMENTS.

1,285,735.

Specification of Letters Patent.

Patented Nov. 26, 1918.

Application filed February 11, 1916. Serial No. 77,777.

*To all whom it may concern:*

Be it known that I, WALTER C. KEYS, a citizen of the United States, and resident of Detroit, Wayne county, State of Michigan, having invented certain new and useful Improvements in Methods of Determining Movements, of which the following is a specification.

This invention relates to methods of determining movements, such as of conveyances, and of means or apparatus for carrying out said methods.

One of the objects of this invention is to provide means for accurately determining the relative movements of various parts of a vehicle, especially while traveling over an irregular surface.

Another object is to provide a simple and effective method and apparatus for determining the result on one part of a conveyance, such as the body, of a movement of another part, such as the running gear.

These and other objects, as will appear hereinafter, I have attained by providing a conveyance, whose movements are to be determined, with one or more distinguishing marks, such as an electric lamp, and moving the vehicle within the photographic range of a camera having a moving or stationary sensitized image recorder exposed during the movement of the vehicle, and thus producing records of the positions of various parts of a vehicle while it is moving.

In brief, the basic idea, involved in my invention, which I believe is novel with me, is to produce a photographic record or curve of the actual movement of a passing vehicle.

In the drawings, which form a part of this specification:

Figure 1 illustrates, more or less diagrammatically, a complete testing "set up" comprising a side elevation of a motor vehicle equipped with distinguishing marks, and a camera mounted with the plane of its sensitized image recorder vertical and parallel with the proposed path of travel of the vehicle;

Fig. 2 is an enlarged vertical sectional view of a lamp or mark mounting substantially on the line 2—2 of Fig. 1;

Fig. 3 is a side elevation of the assembly shown in Fig. 2;

Fig. 4 is an enlarged transverse section substantially on the line 4—4 of Fig. 1;

Fig. 5 is an enlarged transverse section, substantially on the line 5—5 of Fig. 1; and Fig. 6 is a perspective view of a testing "set up" similar to that shown in Fig. 1, also illustrating the curves which would be recorded in the camera by a continued exposure of its sensitized film or plate during a movement of the car, from left to right, within the photographic range of the camera.

Referring more particularly to the drawings, 10 represents a vehicle body yieldingly suspended on the usual front and rear springs 11 and 12 and wheels 13 and 14, which comprise the running gear. The body is provided with the usual front and rear seats 15 and 16 and front and rear fenders 17 and 18.

A road contour is illustrated diagrammatically at 19.

A distinguishing mark, in the form of a self contained battery lamp 20, may be secured, in any well known manner, to the hub cap of the front wheel 13. A similar lamp 21 may be detachably secured, as by a clamp 22, to the down turned flange 23 of the front fender 17 in substantially the same vertical plane as the lamp 20.

Secured, as by screws 24, to the hub cap 25 of the rear wheel 14 is a supporting stud 26, on which may be arranged a bearing 27, which is secured in position by a nut 28. Two parts of a cap member 29 may be arranged over the bearing 27 and clamped together by bolts 30. Secured to the cap member, as by a bolt 31, is a depending arm 32, on which a lamp 33 may be secured. The upper part of the cap member may be formed with a boss 34, in which may be threaded the rear end of a tube 35, the front end of which is adapted to be loosely arranged in an eye 36 of a clamp 37 secured to the running board, and provided with threaded nuts 38 and 39 mounted on opposite sides of the eye. Another lamp 40 may be arranged in vertical alinement with the lamp 33, on a clamp 41 which may be mounted on the rear fender in a manner similar to the lamp on the front fender.

Other lamps 42 and 43 may be strapped, or otherwise secured to the arm, neck or head of passengers in the front and rear seats, respectively, or if desired, these lamps may be mounted on weights, not shown, on the seats.

It will be noted that all of the lamps are arranged in different horizontal planes and it will be understood that to further distinguish between the lamps while they are moving, I prefer to have the three rearmost lamps of greater intensity, or of different light quality, than the other.

A camera 44, which is provided with the usual sensitized film or plate image recorder, may be set up at a proper distance from the piece of road or pavement, on which it is desired to test the movements or riding qualities of the vehicle. The plane of the sensitized recorder will be substantially vertical and parallel with the proposed direction of movement of the vehicle.

The camera having been correctly focused, if the test is to be made at night, the distinguishing lamps on the vehicle will be illuminated and the car driven across in front of the camera within its photographic range, while the plate is intermittently, or preferably continuously, exposed, with the result that the developed recorder will reproduce light lines or spots showing the path of travel of the part on which the less intense lamp is mounted, and heavier lines showing the path of the more intense lamps. Characteristic curves, which will be produced on an image recorder by a night test with the above described equipment, are illustrated in Fig. 6. To obtain exact comparisons, the vehicle should always travel over the same ground, with the camera set up in the same location and alinement. My methods and apparatus may be also used to obtain records of the actual profile of the testing road, by driving the car very slowly, say one mile per hour, to eliminate tire depression, or by moving a portable light over the surface of road within the photographic range of the camera while the recorder is exposed, thus producing a line or road contour curve, as above described. The road profile curve may be recorded upon the same sensitized surface as the records of the other curves are placed, by making a separate exposure of the camera.

Most, if not all, instruments previously devised for recording riding qualities have had the inherent fault that their moving parts have natural periods of vibration. The amplitude of movement of these parts becomes proportionately great when the road shocks occur in intervals of time which synchronize with the natural periods of vibration of these parts; therefore, a series of small shocks in synchronism with these periods of vibration may give a record of great amplitude and entirely out of proportion with the vertical shock received by car.

I believe that mine is the first device ever invented which will record simultaneously, and with absolute accuracy the path of travel of all the critical points of an automobile or other conveyance. The complete action of tires, chassis springs, and cushion springs can at once be determined. The periods of vibration of passengers on cushion springs, of front and rear ends of car on chassis springs, and of wheels upon tires, can be accurately and positively determined, since the scale (inches to feet) of the record, and the speed of travel are both known, when each record is made. Heretofore it has been necessary to depend upon the mental impression received by passengers in automobiles. These impressions are modified by the mental and physical condition of the passenger at the time he rides, and it is a well known fact to automobile engineers that the impression produced simultaneously upon two passengers in the same automobile are often at wide variance.

My method of obtaining actual records eliminates this variation and permits of complete permanent records being kept for as many combinations of load, tires, chassis springs, shock absorbers, auxiliary springs, cushion springs, spring wheels, rebound checks, etc., as may be desired.

While I have provided self contained battery lamps for the various marks, these may be connected to a common source of current by flexible wires, or, if it is desired to make the tests in day light, other suitable distinguishing marks may be used, for obtaining similar, though perhaps not as clearly defined results. And, although I have shown my invention as applied to the determination of road contours and conveyance movements, it will be understood, that it may be applied to various other uses; and various modifications of my methods and equipment may be made, without departing from the spirit and scope hereof.

Having thus described my invention, what I claim and desire to secure by Letters Patent is:

1. In a movement determining apparatus, the combination with a vehicle running gear, a resiliently mounted body thereon, of distinguishing mark arranged on said running gear, another distinguishing mark resiliently arranged on said body, a camera having a sensitized image recorder, and means for continuously exposing said recorder during a movement of said vehicle within the photographic range of the camera.

2. In a movement testing apparatus, the combination of a vehicle running gear, distinguishing marks arranged in different planes thereon, a resiliently mounted body on the running gear, having distinguishing marks in planes different from said other marks, a camera having a stationary sensitized image recorder, and means for continuously exposing said recorder during a movement of said vehicle within the photographic range of the camera.

3. In a movement testing apparatus, the combination of a vehicle running gear, detachable distinguishing marks arranged in different planes thereon, a resiliently mounted body on said running gear, provided with a plurality of detachable distinguishing marks arranged in planes different from said other marks, a camera having a stationary sensitized image recorder, and means for continuously exposing said recorder during movement of said vehicle within the photographic range of said camera.

In testimony whereof I affix my signature.

WALTER C. KEYS.